United States Patent [19]

Strack et al.

[11] Patent Number: 4,542,115
[45] Date of Patent: Sep. 17, 1985

[54] ZEOLITE GRANULATE, PROCESS FOR ITS PRODUCTION

[75] Inventors: Hans Strack; Peter Kleinschmit, both of Hanau; Ehrfried Parr, Rodenbach, all of Fed. Rep. of Germany

[73] Assignee: Degussa Aktiengesellschaft, Frankfurt, Fed. Rep. of Germany

[21] Appl. No.: 406,526

[22] Filed: Aug. 9, 1982

[30] Foreign Application Priority Data

Aug. 17, 1981 [DE] Fed. Rep. of Germany ....... 3132379

[51] Int. Cl.⁴ .................. B01J 29/06; C10B 33/28
[52] U.S. Cl. ............................ 502/64; 502/70; 423/328
[58] Field of Search ............ 252/455 Z; 502/8, 64, 502/70; 423/328

[56] References Cited

U.S. PATENT DOCUMENTS

| | | | |
|---|---|---|---|
| 3,234,147 | 2/1966 | Drost et al. | 252/455 Z |
| 3,296,151 | 1/1967 | Heinze et al. | 252/455 Z |
| 3,356,450 | 12/1967 | Heinze et al. | 252/455 Z |
| 3,382,187 | 5/1968 | Drost et al. | 252/455 Z |
| 3,886,094 | 5/1975 | Pilato et al. | 502/70 X |
| 4,073,867 | 2/1978 | Roebke | 423/429 |
| 4,303,626 | 12/1981 | Strack | 423/329 |
| 4,303,627 | 12/1981 | Strack | 423/329 |
| 4,303,628 | 12/1981 | Strack | 423/329 |
| 4,303,629 | 12/1981 | Strack | 423/329 |
| 4,305,916 | 12/1981 | Strack | 423/329 |

FOREIGN PATENT DOCUMENTS

| | | |
|---|---|---|
| 1186448 | 2/1965 | Fed. Rep. of Germany . |
| 1944879 | 3/1971 | Fed. Rep. of Germany . |
| 1792943 | 12/1972 | Fed. Rep. of Germany . |
| 2447021 | 5/1976 | Fed. Rep. of Germany . |
| 2642513 | 4/1977 | Fed. Rep. of Germany . |
| 2642518 | 3/1978 | Fed. Rep. of Germany . |
| 2642519 | 3/1978 | Fed. Rep. of Germany . |
| 2651419 | 5/1978 | Fed. Rep. of Germany . |
| 2651420 | 5/1978 | Fed. Rep. of Germany . |
| 2651436 | 5/1978 | Fed. Rep. of Germany . |
| 2651437 | 5/1978 | Fed. Rep. of Germany . |
| 2651445 | 5/1978 | Fed. Rep. of Germany . |
| 2651485 | 5/1978 | Fed. Rep. of Germany . |
| 2517218 | 10/1978 | Fed. Rep. of Germany . |

Primary Examiner—Carl F. Dees
Attorney, Agent, or Firm—Cushman, Darby & Cushman

[57] ABSTRACT

According to the invention there are produced sodium Zeolite A granulates having the following parameters:

| Adsorption Data: (p/po = 0.8, 20° C.) | |
|---|---|
| $H_2O$ | >22.0% |
| $NH_3$ | >11.0% |
| $CO_2$ | ≦0.1% |
| $O_2$ | ≦0.1% |
| $N_2$ | ≦0.1% |
| Ar | ≦0.1% |
| $CH_3OH$ | ≦0.2% |
| $CH_3-CH_2-OH$ | ≦0.2% |

The zeolite granulate is produced by having zeolite A powder present in a mixer, adding alkali silicate solution, mixing until there are obtained zeolite granulates having a particle size of at least 0.1 mm, in a given case post-rolling the granulates, first drying the moist zeolite granulates with air in a fluidized bed drier at a temperature of 20° to 39° C., during which the carbon dioxide content of the drying air is adjusted to less than 200 ppm, subsequently drying in a second drying step at a temperature of 40°–120° C. and in a given case drying in a third drying step at 121°–200° C. under otherwise the same conditions and subsequently activating the thus obtained granulates at a temperature of at most 600° C. in a rotary tube. The zeolite granulate is used in the production of insulating glass windows.

15 Claims, No Drawings

ZEOLITE GRANULATE, PROCESS FOR ITS PRODUCTION

BACKGROUND OF THE INVENTION

The invention is directed to zeolite granulates, the process of producing them by working zeolite with an alkali silicate solution and the use of the zeolite granulates in the production of insulating glass windows.

It is known to produce bound zeolitic molecular sieves with the help of waterglass by forming a crystalline zeolite jointly with alkali silicate, preferably potassium silicate, having a module of $Me_2O:SiO_2 = 1:3$ to 1:5, drying the formed product with a current of air which has at least 200 ppm of carbon dioxide and a water vapor partial pressure of at least 10 mm Hg, drying at a temperature of 40° to 300° C., subsequently washing with a 0.1–30% solution of sodium salt solution and/or water and activating at a temperature above 200° C. (see German AS No. 17 97 743).

This process has the disadvantage that the thus obtained zeolite granulates must be subjected to an additional washing step and an additional drying step and in spite thereof in this form there is not attained the typical high adsorption capacity for water vapor for an A-zeolite.

The subject matter of the invention is a zeolite granulate of Type Zeolite NaA having a higher capacity for water.

The zeolite granulates of Type NaA according to the invention have the following parameters:

| Adsorption Data: (p/po = 0.8, 20° C.) | |
|---|---|
| $H_2O$ | >22.0% |
| $NH_3$ | >11.0% |
| $CO_2$ | ≦0.1% |
| $O_2$ | ≦0.1% |
| $N_2$ | ≦0.1% |
| Ar | ≦0.1% |
| $CH_3OH$ | ≦0.2% |
| $CH_3—CH_2—OH$ | ≦0.2% |

The zeolite granulate of the invention can be produced by having zeolite A powder present in a mixer, adding alkali silicate (e.g., sodium silicate) solution, mixing until there are obtained zeolite granulates having a particle size of at least 0.1 mm, in a given case post-rolling the granulates, first drying the moist zeolite granulates with air at a temperature of 20° to 39° C., during which the carbon dioxide content of the drying air is regulated to less than 200 ppm, subsequently drying in a second drying step at a temperature of 40°–120° C. and in a given case drying in a third drying step at 121°–200° C. under otherwise the same conditions and subsequently activating the thus obtained granulates at a temperature of at most 600° C., for example, in a rotary tube.

As zeolite a there can be employed a powdery zeolite which has been produced according to German OS No. 24 47 021 (and related Roebke U.S. application Ser. No. 333,711 filed Dec. 23, 1981, and now abandoned, German OS No. 25 17 218 and related Roebke U.S. Pat. No. 4,073,867, German OS No. 26 51 419 and related Strack U.S. Pat. No. 4,303,628, German OS No. 26 51 420 and related Strack U.S. Pat. No. 4,303,626, German OS No. 26 51 436 and related Strack U.S. Pat. No. 4,305,916, German OS No. 26 51 437 and related Strack U.S. Pat. No. 4,303,627, German OS No. 26 51 445, German OS No. 26 51 485 and related U.S. Pat. No. 4,303,629 and which have the particle size distribution stated there. The entire disclosures of the cited Roebke U.S. application and U.S. patent and of the cited Strack U.S. patents are hereby incorporated by reference and relied upon. Similarly the entire disclosure of German OS No. 26 51 445 is incorporated by reference and relied upon.

Preferably there is used a zeolite powder of Type A according to German OS No. 26 51 485 and the related Strack U.S. Pat. No. 4,303,629.

The water content of the zeolites can be 0–27%, preferably 15 to 22%. As alkali silicate solution there can preferably be employed a sodium silicate solution which has a module $SiO_2:Na_2O$ of 1.0 to 3.4 and a content of $Na_2O$ of 2–20 weight % and an $SiO_2$ of 5–31 weight %.

The mixture of zeolite A and waterglass contains the components $Na_2O:Al_2O_3:SiO_2:H_2O$ in the ratio $1.2 \pm 0.2\ Na_2O:Al_2O_3:2.4 \pm 0.4\ SiO_2:12 \pm 3\ H_2O$.

As the mixer there can be employed a commercial mixer which preferably contains a nozzling in device such as plow share mixers, screw mixers mixing granulators among other.

As post-rolling apparatus one of ordinary skill can use running aggregates such as granulating plates, coating drums among others. Thereby there can be produced a mechanical compression and rounding off of the granulates as well as a narrowing of the particle size distribution.

The drying of the zeolite granulates can be carried out in known apparatus such as drying ovens, belt driers, or fluidized bed driers continuously or discontinuously. Preferably there is employed a fluidized bed drier since thereby there can be produced simultaneously a separation of dust from the granulates. The waste air of the drying step can be recycled whereby for regulation of the carbon dioxide content to less than 200 ppm the waste drying air is mixed with the corresponding amount of fresh air.

The drying can be carried out just as well in an inert gas stream, as, for example, nitrogen, i.e., the presence of carbon dioxide is not necessary.

The drying gas can have a water vapor partial pressure of 0.01 mm up to 750 mm Hg, in which case the partial pressure of the water vapor in the drying gas must be below the saturation pressure at the corresponding drying temperature. In a given case a screening with known sieve devices takes place in which case the screening can be carried out as well on wet or on dried granulates. In the case of wet screening there must be avoided a mechanical destruction of the granulates, but hereby the wrong sized particles (over and under size particles) can be mechanically disintegrated easily and returned into the granulation process. The dried zeolite granulates can be activated at a temperature of 300° to 500° C., at most 600° C. in known apparatus such as muffle furnaces, rotary tube furnaces, tube furnaces or other device continuously or discontinuously.

The zeolite granulate of Type NaA according to the invention is particularly suited as drying agent for insulating glass windows.

As is well known K-A zeolite granulate have all around properties for insulating glasses (Company prospectus of Bayer AG, Leverkusen "Baylith, das Molekularsieb für den Isolierglassektor", page 4, issued 8/80, Order No. AC1358, the entire disclosure of this publication is hereby incorporated by reference and relied upon), since it selectively adsorbs only water, but not other gases such as nitrogen or argon. The generally used commercial NaA granulates, however, adsorb not only water but also nitrogen and argon, so that for the production of argon filled panes of glass there must be used K-A zeolite. However, these zeolite granulates have the disadvantage that they are produced from NaA zeolite through ion exchange with potassium salt solution and therefore are substantially more expensive than NaA zeolite granulates.

However, the NaA zeolite granulates of the invention surprisingly possess the all around properties of the K-A granulates and thereby are industrially substantially easier to produce because according to the invention the ion exchange treatment is eliminated. The NaA zeolite granulate filled insulating windows can be prepared as set forth in the Bayer publication, for example.

The process can comprise, consist essentially of or consist of the recited steps with the stated materials and the products can comprise, consist essentially of, or consist of the stated materials.

Unless otherwise indicated all parts and percentages are by weight.

DETAILED DESCRIPTION

EXAMPLE 1

There were present in a screw mixer 100 kg of zeolite A (made according to German OS No. 26 51 485 and related Strack U.S. Pat. No. 4,303,629, having a water content of 21%). To this there were added 49 kg of waterglass (Module 3.38, $Na_2O$=4.8 weight %, $SiO_2$=15.7 weight %). There were obtained granulates having a particle size of 0.1 to 3 mm, which were subsequently post-rolled on a granulating plate. There was thus obtained a narrow particle spectrum (0.3–2.5 mm). The granulates were screened in the wet condition into particle fractions <1 mm, 1–2 mm and >2 mm.

The particle fraction of 1–2 mm was dried in a fluidized bed drier in a first step at 35° C. and in a second step at 110° C. Hereby a part of the waste air was recycled so that the $CO_2$ content of the air was 150 ppm. The partial pressure of the water vapor in the first step was 21 mm Hg and in the second step 117 mm Hg. The granulates were activated in a rotary tubular furnace at 420° C.

The product had the following properties.

| Particle Size | 1–2 mm |
| --- | --- |
| Appearance | round, white, dust free |
| Resistance to Fracture | at least 2 kg (1 mm beads) |
| Adsorption Data | (p/po = 0.8 20° C.) |
| $H_2O$ | 23.4% |
| $NH_3$ | 12.0% |
| $CO_2$, $O_2$, $N_2$, Ar | <0.1% |
| Methanol, Ethanol | <0.2% |

EXAMPLE 2

12 kg of zeolite A (made according to German OS No. 26 51 485 and related Strack U.S. Pat. No. 4,303,629, having a water content of 10.1%) were mixed with 8.4 kg of sodium silicate solution (8.4% $Na_2O$, 8.0% $SiO_2$, module 1.0) as described in Example 1, granulated and dried in the drying oven first at 30° C., then at 110° C. After the activation in a muffle furnace at 400° C. the sample showed the following adsorption data.

| | (p/po = 0.8 20° C.) |
| --- | --- |
| $H_2O$ | 28.9% |
| $NH_3$ | 14.2% |
| $CO_2$, $O_2$, $N_2$, Ar | 0.1% |
| Ethanol | 0.1% |
| Methanol | 0.15% |

EXAMPLE 3 (Comparison Example)

There were simultaneously dosed into a granulating dish via a shaking trough 5 kg/h of zeolite A (made according to German OS No. 24 47 021 and related Roebke U.S. application Ser. No. 333,711, filed Dec. 23, 1981, 16.2% water) and via a nozzle 2.1 kg/h of sodium silicate (12.5% $Na_2O$, 22.2% $SiO_2$, module 1.83) and pelletized by building up granulation. After the drying and activating according to Example 1 there were obtained the following adsorption data:

| | (p/po = 0.8 20° C.) |
| --- | --- |
| $H_2O$ | 17.8% |
| $NH_3$ | 8.0% |
| $CO_2$, Methanol, Ethanol | <0.1% |

EXAMPLE 4

The wet granulates obtained according to Example 1 were dried in a horizontal, heatable glass tube in a stream of pure nitrogen (water vapor partial pressure 0.1 mm Hg) first at 22° C., then at 110° C. and activated in the same apparatus while further leading nitrogen through at 400° C.

| Adsorption Data: | (p/po = 0.8 20° C.) |
| --- | --- |
| $H_2O$ | 23.0% |
| $NH_3$ | 12.2% |
| $N_2$, $O_2$, $CO_2$, Ar | 0.1% |
| Methanol, Ethanol | 0.12% |

The entire disclosure of German priority application No. P 31 32 379.0 is hereby incorporated by reference.

What is claimed is:

1. Zeolite granulates of zeolite Type NaA having the following parameters:

| Adsorption Data: (p/po = 0.8, 20° C.) | |
| --- | --- |
| $H_2O$ | >22.0% |
| $NH_3$ | >11.0% |
| $CO_2$ | ≦0.1% |
| $O_2$ | ≦0.1% |
| $N_2$ | ≦0.1% |
| Ar | ≦0.1% |
| $CH_3OH$ | ≦0.2% |
| $CH_3$—$CH_2$—OH | ≦0.2%. |

2. A process for the production of the zeolite granulates of claim 1 comprising having zeolite A powder present in a mixer, adding aqueous alkali silicate solution, mixing until there are obtained zeolite granulates having a particle size of at least 0.1 mm, first drying the moist zeolite granulates with air at a temperature of 20° to 39° C., during which the carbon dioxide content of the drying air is regulated to less than 200 ppm, subsequently drying in a second drying step at a temperature of 40°-120° C. and subsequently activating the thus obtained granulates at a temperature of at most 600° C.

3. A process according to claim 2 including the step of post-rolling the granulates before the first drying step.

4. A process according to claim 3 comprising drying in a third drying step at 121°-200° C. prior to activating the granulates.

5. A process according to claim 2 comprising drying in a third drying step at 121°-200° C. prior to activating the granulates.

6. A composition consisting essentially of the zeolite Type NaA granulates of claim 1.

7. A composition consisting of the zeolite Type NaA granulates of claim 1.

8. A process according to claim 2 wherein the materials employed consist essentially of those set forth.

9. Zeolite granulates of zeolite Type NaA prepared by the process of claim 8.

10. A process according to claim 2 wherein the materials consist of those set forth.

11. Zeolite granulates of zeolite Type NaA prepared by the process of claim 10.

12. A process according to claim 3 wherein the materials employed consist essentially of those set forth.

13. A process according to claim 4 wherein the materials employed consist essentially of those set forth.

14. A process according to claim 5 wherein the materials employed consist essentially of those set forth.

15. Granulates according to claim 1 having a particle size spectrum of 1 to 2 mm.

* * * * *